United States Patent
Morioka et al.

(10) Patent No.: US 9,826,146 B2
(45) Date of Patent: Nov. 21, 2017

(54) VIDEO CAPTURING APPARATUS, VIDEO CAPTURING SYSTEM AND VIDEO CAPTURING METHOD

(71) Applicant: Panasonic Intellectual Property Management Co., Ltd., Osaka (JP)

(72) Inventors: Yoshihiro Morioka, Nara (JP); Kenji Matsuura, Nara (JP); Hideaki Hatanaka, Kyoto (JP); Eiji Yamauchi, Osaka (JP); Mitsuyoshi Okamoto, Osaka (JP); Akio Nishiyama, Hyogo (JP); Hirofumi Ishii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/054,665

(22) Filed: Feb. 26, 2016

(65) Prior Publication Data
US 2016/0182818 A1    Jun. 23, 2016

Related U.S. Application Data

(63) Continuation of application No. PCT/JP2014/006451, filed on Dec. 25, 2014.

(30) Foreign Application Priority Data

Dec. 27, 2013   (JP) .................. 2013-271280

(51) Int. Cl.
*H04N 5/232* (2006.01)
*G03B 15/00* (2006.01)
(Continued)

(52) U.S. Cl.
CPC ......... *H04N 5/23222* (2013.01); *G03B 15/00* (2013.01); *G03B 17/561* (2013.01);
(Continued)

(58) Field of Classification Search
None
See application file for complete search history.

(56) References Cited

U.S. PATENT DOCUMENTS 6,215,519 B1 * 4/2001 Nayar ............. G08B 13/19608
348/148
7,106,374 B1 * 9/2006 Bandera ............. H04N 5/23206
348/170

(Continued)

FOREIGN PATENT DOCUMENTS

JP    11-177877    7/1999
JP    2000-333159   11/2000
(Continued)

OTHER PUBLICATIONS

Wikipedia—Comparator, downloaded Mar. 28, 2017 from https://en.wikipedia.org/wiki/Comparator.*
(Continued)

*Primary Examiner* — Timothy J Henn
(74) *Attorney, Agent, or Firm* — Wenderoth, Lind & Ponack, L.L.P.

(57) ABSTRACT

A generator generates attribute information regarding a video image, which is captured by an imaging unit by capturing a plurality of capture directions, on a predetermined unit of video content. A composition map generator extracts a predetermined object, based on the attribute information of the video images captured in the plurality of capture directions within a predetermined period, and generates a composition map indicating a position of the extracted object. A comparator determines priority orders in the respective pieces of shooting of the respective capture directions based on a comparison result obtained by comparing pieces of the attribute information, for each of the capture directions and based on the attribute information included in the composition map. A camera work controller
(Continued)

determines a next capture direction based on the priority orders, and controls operations of the imaging unit and a camera pantilter based on the determined capture direction.

8 Claims, 13 Drawing Sheets

(51) Int. Cl.
G03B 17/56 (2006.01)
G06K 9/00 (2006.01)
H04N 5/272 (2006.01)
G06K 9/62 (2006.01)

(52) U.S. Cl.
CPC ..... *G06K 9/00718* (2013.01); *G06K 9/00744* (2013.01); *G06K 9/6202* (2013.01); *H04N 5/23238* (2013.01); *H04N 5/23293* (2013.01); *H04N 5/272* (2013.01)

(56) References Cited

U.S. PATENT DOCUMENTS

| | | | |
|---|---|---|---|
| 7,643,055 B2 * | 1/2010 | Uebbing | H04N 7/181 348/152 |
| 8,587,661 B2 * | 11/2013 | McCubbrey | G08B 13/19608 348/159 |
| 8,791,984 B2 * | 7/2014 | Jones | G08B 13/19641 348/36 |
| 9,363,487 B2 * | 6/2016 | Chosak | G06K 9/00771 |
| 2007/0189758 A1 | 8/2007 | Iwasaki | |
| 2007/0230943 A1 * | 10/2007 | Chang | G03B 37/00 396/322 |
| 2011/0025854 A1 | 2/2011 | Yoshizumi | |
| 2011/0216159 A1 | 9/2011 | Yoshizumi | |
| 2012/0002056 A1 | 1/2012 | Nam et al. | |
| 2013/0208005 A1 | 8/2013 | Kasahara et al. | |
| 2016/0028951 A1 * | 1/2016 | Mayuzumi | G06K 9/00335 348/36 |
| 2016/0323504 A1 * | 11/2016 | Ono | G03B 17/00 |

FOREIGN PATENT DOCUMENTS

| | | |
|---|---|---|
| JP | 2004-266668 | 9/2004 |
| JP | 2011-30160 | 2/2011 |

OTHER PUBLICATIONS

Wikipedia—Digital Comparator, downloaded Mar. 28, 2017 from https://en.wikipedia.org/wiki/Digital_comparator.*

International Search Report dated Apr. 7, 2015 in corresponding International Application No. PCT/JP2014/006451 (with English translation).

* cited by examiner

FIG. 9A

| Capture region | Priority order |
|---|---|
| 1 | 1 |
| 2 | 1 |
| 3 | 1 |
| 4 | 1 |
|  |  |
| 11 | 1 |

FIG. 9B

| Capture region | Priority order |
|---|---|
| 1 | 3 |
| 2 | 2 |
| 3 | 1 |
| 4 | 3 |
| ⋮ | ⋮ |
| 11 | 3 |

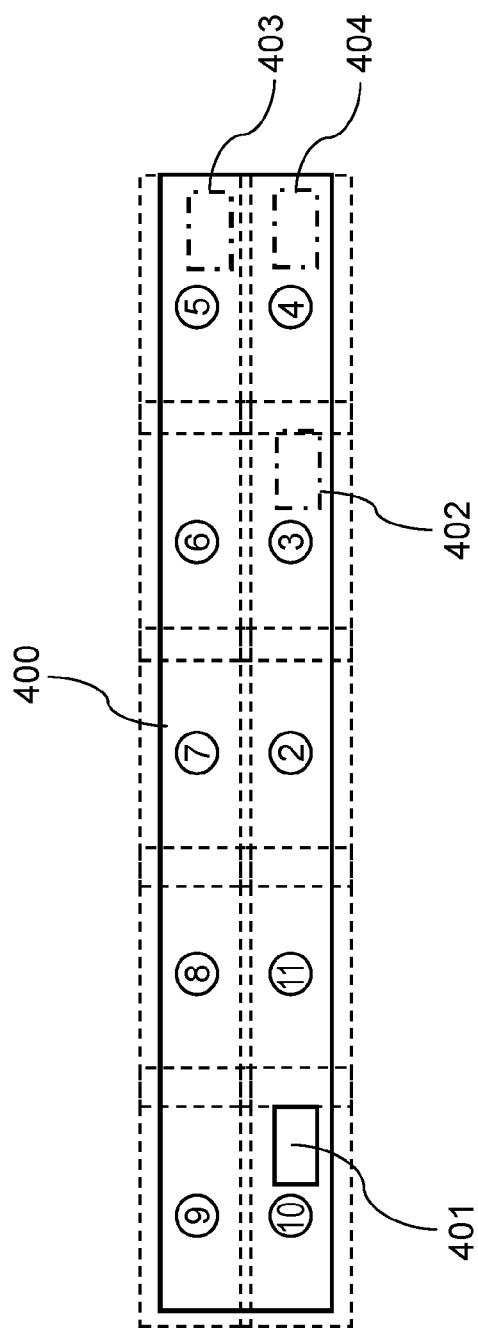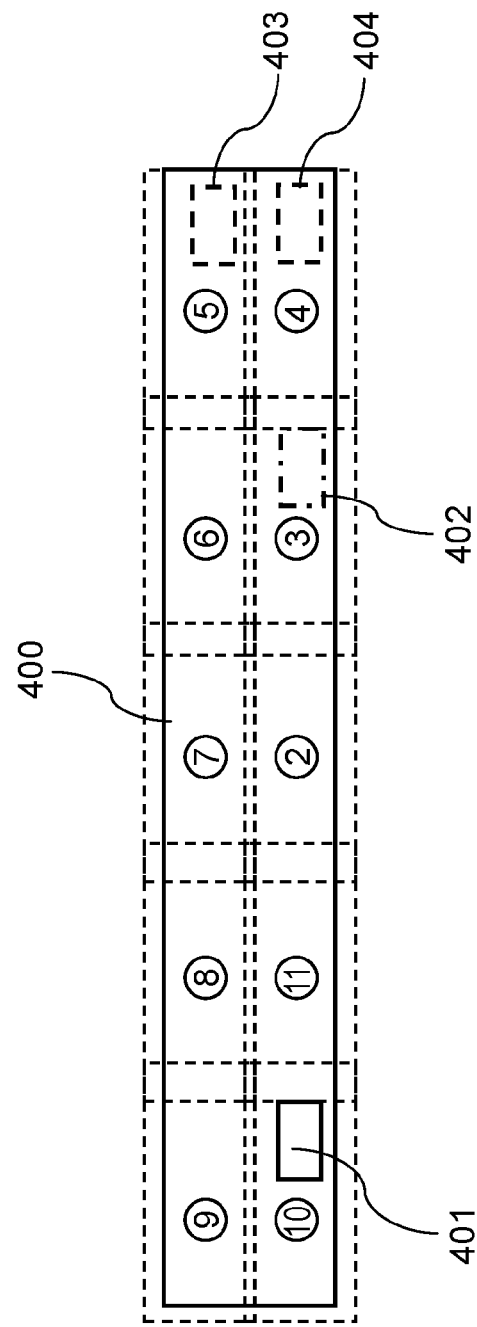
FIG. 13A
FIG. 13B

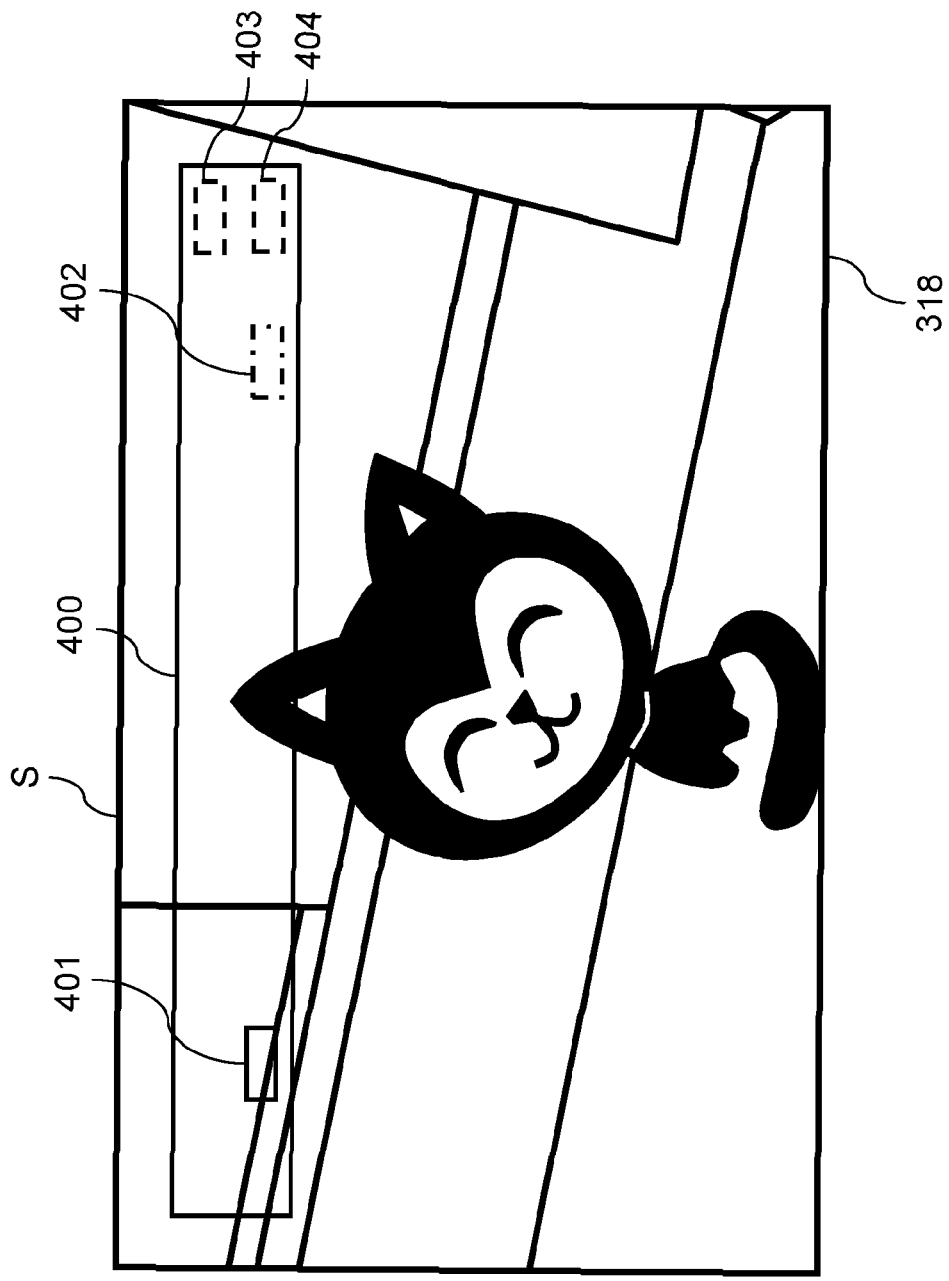

//VIDEO CAPTURING APPARATUS, VIDEO CAPTURING SYSTEM AND VIDEO CAPTURING METHOD

TECHNICAL FIELD

The present disclosure relates to a video capturing apparatus, a video capturing system and a video capturing method, which determine a capture direction based on a content of a captured video.

BACKGROUND ART

Heretofore, there has been known a video capturing system including a camera and a camera pantilter, the video capturing system automatically determining a composition, and performing pan/tilt/zoom adjustments.

In this video capturing system, also with regard to a searching technique for the composition in a case where some defect occurs, for example, such a proposal of performing capturing after elapse of a predetermined time is made (for example, Unexamined Japanese Patent Publication No. 2011-030160).

SUMMARY

A video capturing system of the present disclosure includes a drive device, and a video capturing apparatus that is connected to the drive device and controls an operation of the drive device. The video capturing apparatus includes an imaging unit, a generator that generates attribute information regarding a video image, which is captured by the imaging unit a predetermined capture range by capturing a plurality of capture directions, on a predetermined unit of video content; a composition map generator that extracts a predetermined object based on the attribute information of the video images captured in the plurality of capture directions within a predetermined period, the predetermined object being present in the predetermined capture range, and generates a composition map indicating a position of the extracted object; a comparator that determines priority orders in the respective pieces of capturing of the respective capture directions based on a comparison result obtained by comparing pieces of the attribute information for each of the capture directions, the pieces of the attribute information being generated during different periods, and based on the attribute information included in the composition map; and a controller that determines a next capture direction based on the priority orders, and controls operations of the imaging unit and the drive device based on the determined capture direction.

With this configuration, an imaging system can be provided, which is capable of intensively capturing a capture direction (capture region) having a high priority order.

BRIEF DESCRIPTION OF DRAWINGS

FIG. 9A is a table showing an example of information of priority orders of capture regions in the first exemplary embodiment.

FIG. 9B is a table showing an example of the information of the priority orders of the capture regions in the first exemplary embodiment.

FIG. 13A is a schematic diagram explaining an example of a composition map in the second exemplary embodiment.

FIG. 13B is a schematic diagram explaining an example of the composition map in the second exemplary embodiment.

FIG. 14 is a diagram showing a display example of the composition map displayed on a display unit in the second exemplary embodiment.

DESCRIPTION OF EMBODIMENTS

A description is made below of exemplary embodiments in detail with reference to the drawings appropriately. However, a more detailed description than necessary is sometimes omitted. For example, a detailed description of an already well-known item and a duplicate description of substantially the same configuration are sometimes omitted. These omissions are made in order to avoid unnecessary redundancy of the following description and to facilitate the understanding of those skilled in the art.

Note that the inventor of the present disclosure provides the accompanying drawings and the following description in order to allow those skilled in the art to fully understand the present disclosure, and does not intend to thereby limit the subject matter described in the scope of claims.

First Exemplary Embodiment

A description is made below of a first exemplary embodiment with reference to FIGS. 1 to 9.

[1-1. Configuration]

[1-1-1. Configuration of Video Capturing System]

Figure 1:
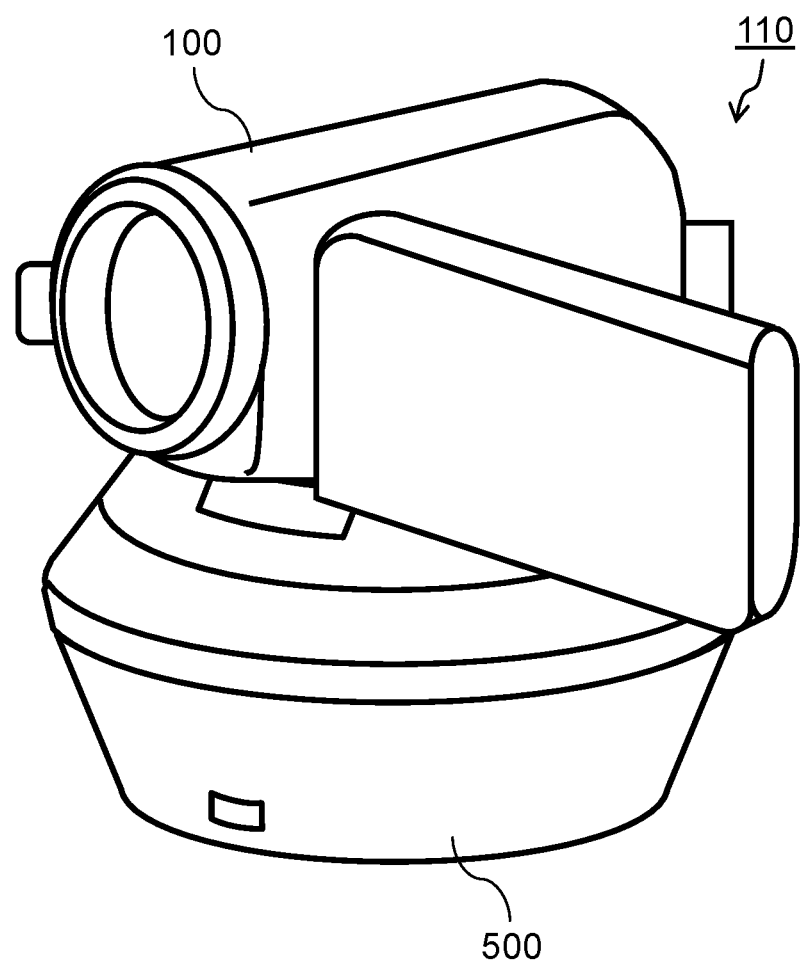
FIG. 1 is an exterior perspective view of a video capturing system in a first exemplary embodiment.
Figure 2:
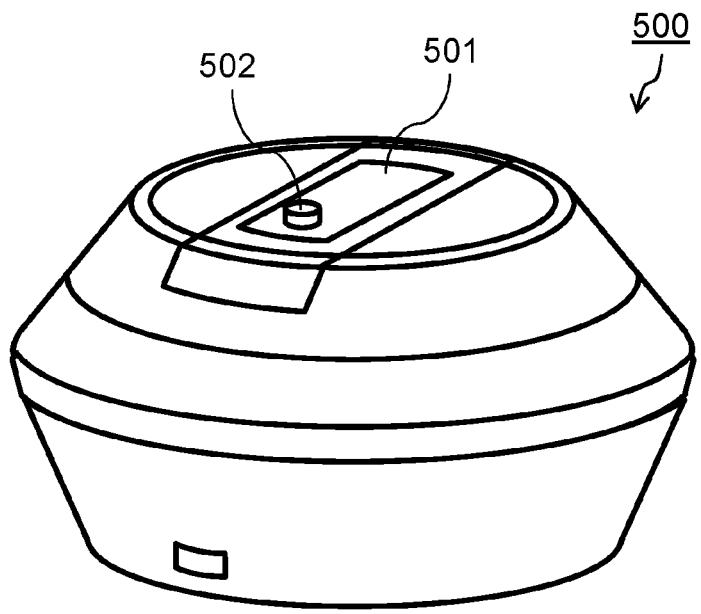
FIG. 2 is an exterior perspective view of a camera pantilter in the first exemplary embodiment.
Figure 3:
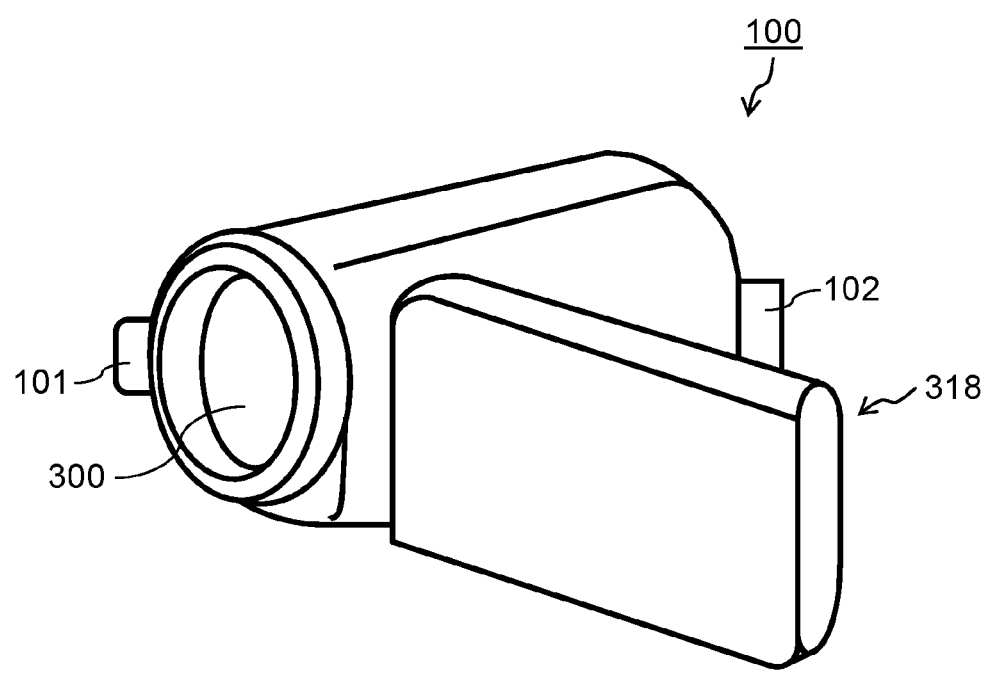
FIG. 3 is an exterior perspective view of a camcorder in the first exemplary embodiment.

FIG. 1 is an exterior perspective view of capturing system 110 according to the first exemplary embodiment. FIG. 2 is an exterior perspective view of camera pantilter 500. FIG. 3 is an exterior perspective view of camcorder 100.

As shown in FIG. 1, capturing system 110 includes camera pantilter 500, and camcorder 100 provided on a top surface of the camera pantilter 500. Camcorder 100 and camera pantilter 500 are connected to each other by a USB cable. Operations of camera pantilter 500 are controlled by camcorder 100. In the first exemplary embodiment, camera pantilter 500 is described as an example of a drive device, and camcorder 100 is described as an example of a video capturing apparatus.

As shown in FIG. 2, attachment portion 501 to which camcorder 100 is to be attached is provided on the top surface of camera pantilter 500. In attachment portion 501, pin 502 is fitted into a hole (not shown) for a positioning pin provided on a bottom surface of camcorder 100, and a pressing force is applied thereto from the above, whereby a part of a spring-type top surface thereof is pressed down. At this time, together with a part of the top surface, camcorder 100 is engaged with a claw provided in an inside of camera pantilter 500, whereby camcorder 100 is fixed in an inclined state (upward by approximately 3°).

As shown in FIG. 3, camcorder 100 includes imaging unit 301 (not shown) that captures a video image, display unit 318 that displays the video image captured by imaging unit 301, grip belt 101, battery 102, and the like. Imaging unit 301 includes a Complementary Metal Oxide Semiconductor (C-MOS) sensor (not shown) that converts light, which is incident from lens unit 300, into a video signal. Display unit 318 includes a touch panel-type liquid crystal display.

[1-1-2. Hardware Configuration of Imaging Device]

Figure 4:
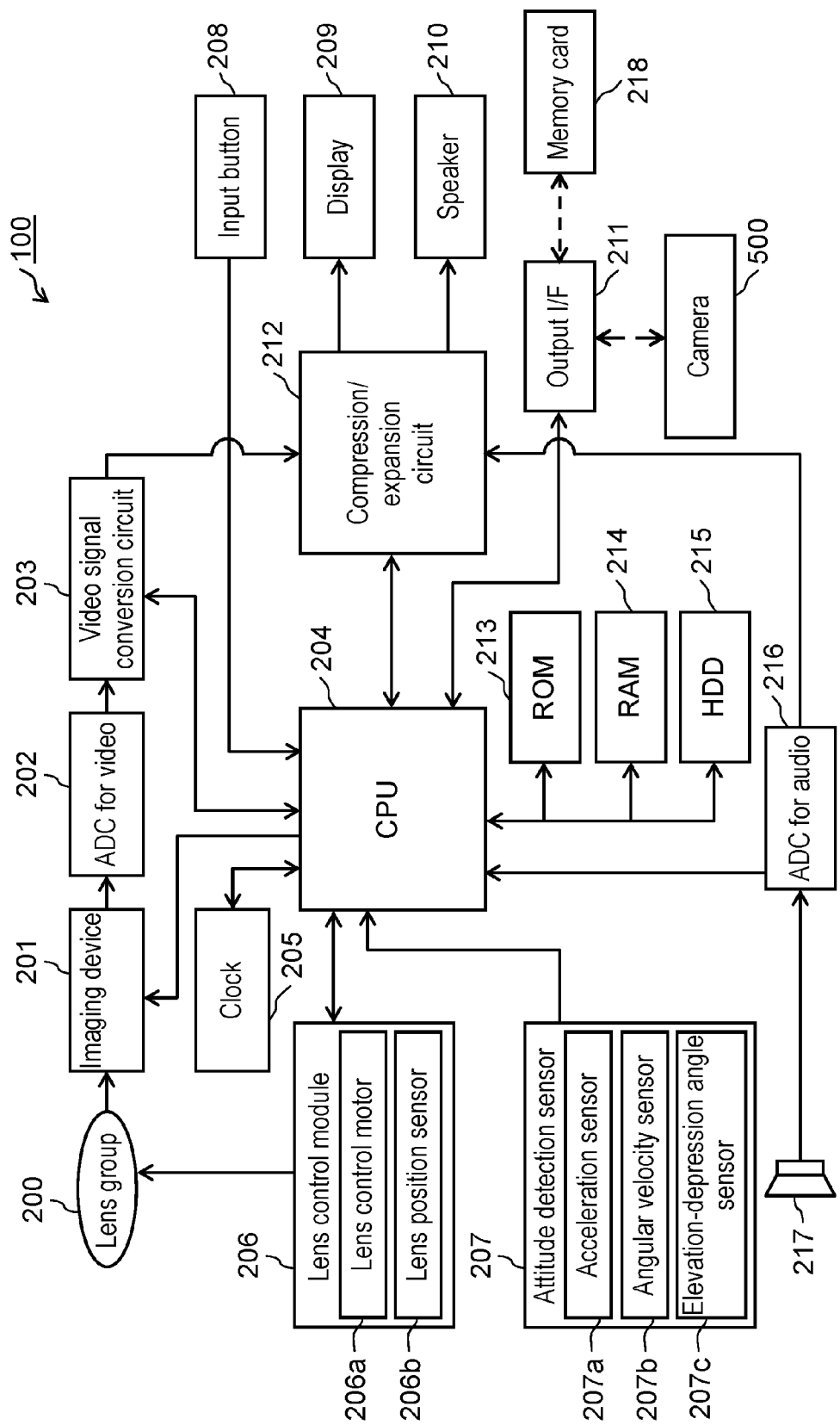
FIG. 4 is a schematic diagram showing a hardware configuration of an inside of the camcorder in the first exemplary embodiment.

FIG. 4 is a schematic diagram of a hardware configuration of an inside of camcorder 100.

Camcorder 100 includes lens group 200, imaging device 201, Analog-to-Digital Converter (ADC) for video 202, video signal conversion circuit 203, Central Processing Unit (CPU) 204, clock 205, lens control module 206, attitude detection sensor 207, input button 208, display 209, speaker 210, output Interface (I/F) 211, compression/expansion circuit 212, Read Only Memory (ROM) 213, Random Access Memory (RAM) 214, Hard Disk Drive (HDD) 215, ADC for audio 216, and stereo microphone 217.

The lens group 200 adjusts light, which is incident from a subject, in order to form a subject image on the imaging device 201. Specifically, lens group 200 adjusts a focal length and a zoom (magnification rate of video) by changing distances between a plurality of lenses having various characteristics. These adjustments may be performed manually by a video taker of camcorder 100 or automatically by control coming from CPU 204 and the like through lens control module 206 to be described later.

Imaging device 201 converts the light, which is incident through lens group 200, into an electrical signal. For imaging device 201, it is possible to use an image sensor such as a Charge Coupled Device (CCD) and a C-MOS sensor.

ADC for video 202 converts the analog electrical signal, which is fed from imaging device 201, into a digital electrical signal. The digital signal converted by ADC for video 202 is output to video signal conversion circuit 203.

Video signal conversion circuit 203 converts the digital signal, which is output by ADC for video 202, into a video signal of a predetermined format such as National Television System Committee (NTSC) system or Phase Alternating Line (PAL) system (that is, a video signal).

CPU 204 controls a whole of camcorder 100. As a type of the control, for example, there is lens control of controlling incident light onto imaging device 201 by performing control for the above-mentioned focal length and zoom of the lenses through lens control module 206. Moreover, there is input control for an external input from input button 208, attitude detection sensor 207 and the like, operation control for compression/expansion circuit 212, or the like. CPU 204 executes these control algorithms by software and the like.

Clock 205 outputs a clock signal, which serves as a criterion of processing operations, to a circuit such as the CPU 204, which operates in camcorder 100. Note that clock 205 is also capable of using a single or plurality of clocks depending on an integrated circuit for use and on data to be handled. Moreover, a clock signal of one oscillator may be multiplied by an arbitrary multiple and used.

Lens control module 206 detects a state of lens group 200, and operates the respective lenses, which are included in lens group 200, based on the control coming from CPU 204. Lens control module 206 includes: a lens control motor 206a; and lens position sensor 206b, which is a sensor for detecting lens position.

Lens control motor 206a is a motor that drives the lenses based on a control signal transmitted from CPU 204. As a result, a relative positional relationship between the plurality of lenses of lens group 200 is changed, and the focal length and zoom of the lenses can be adjusted. In such a way, the incident light that has passed through lens group 200 forms the subject image, which is taken as a target, on imaging device 201.

Lens position sensor 206b detects distances between the plurality of lenses which compose lens group 200, the positional relationship therebetween, and the like. Position information between the plurality of lenses, and the like, which are detected by lens position sensor 206b, are transmitted to CPU 204. Based on the information coming from lens position sensor 206b and based on information coming from other constituents such as imaging device 201, CPU 204 transmits a control signal for appropriately disposing the plurality of lenses to lens control motor 206a.

Note that, besides the above, CPU 204 may perform control for detecting a hand shanking, which occurs at a time when the video image is captured by camcorder 100, by lens position sensor 206b, attitude detection sensor 207 to be described later, and the like, and driving lens control motor 206a. In such a way, CPU 204 is also capable of executing an operation of an image stabilization against hand shaking through lens control module 206.

Attitude detection sensor 207 detects a state of the attitude of camcorder 100. Attitude detection sensor 207 includes acceleration sensor 207a, angular velocity sensor 207b, and elevation-depression angle sensor 207c, which is a sensor for detecting elevation-depression angles. These various sensors allow CPU 204 to detect a state of capturing process of camcorder 100. Note that, desirably, these sensors can perform the detection individually in three-axis directions (vertical direction, horizontal direction and the like) in order to detect the attitude of camcorder 100 in detail.

Input button 208 is one of input interfaces to be used by the video taker of camcorder 100. By input button 208, the video taker becomes capable of transmitting, to camcorder 100, various requests of start or end of capturing, insertion of a marking in the video image during capturing of the video image. Moreover, display 209 to be described later may be formed as a touch panel, and may compose a part of input button 208.

Display 209 is provided in order to allow the video taker to watch the video image at the time when the video is captured by camcorder 100, to watch a stored video, and so on. Display 209 allows the video taker to confirm the captured video instantaneously. Moreover, besides the above, various information of camcorder 100 is displayed, whereby it becomes possible to transmit more detailed information such as information about capturing process, the instrument information to the video taker.

Speaker 210 is used for a sound in an event of playing back the captured video. Besides, speaker 210 is also capable of transmitting a warning, which is to be output by camcorder 100, to the video taker by sound.

Output I/F 211 is used for outputting the video image, which is captured by camcorder 100, to an external instrument, and outputting a control signal for controlling an operation of camera pantilter 500 to be described later. Specifically, output I/F 211 is a cable interface in a case of connecting camcorder 100 to the external instrument by a cable, a memory card interface in a case of recording the captured video image in a portable memory card 218, and the like. The captured video image is output through output I/F 211, whereby it becomes possible to watch the captured video image by using an external display larger than display 209 built in camcorder 100, and so on.

Compression/expansion circuit 212 converts the captured video images and sounds into a predetermined digital data format (that is, coding process). Specifically, compression/expansion circuit 212 performs coding of Moving Picture Experts Group (MPEG) standard, H.264 standard or the like for the captured video data and such sound data, and converts the video image and sound data into a predetermined data format. Moreover, at a time of playing back the captured data, compression/expansion circuit 212 performs data processing for expanding the video data in the predetermined data format, and displaying the expanded video data on display 209 and the like. Note that compression/expansion circuit 212 may be one provided with a function to also compress/expand a still image in a similar way to the videos.

ROM 213 stores a software program to be processed by CPU 204 and various data for operating the program.

RAM 214 is used as a memory region to be used at a time when the software program to be processed by CPU 204 is executed. Moreover, compression/expansion circuit 212 may share this RAM 214.

HDD 215 is used for a purpose of accumulating the video data encoded by compression/expansion circuit 212 and still image data, and so on. Note that, with regard to data to be stored, besides the above, it is also possible to store data of playback information to be described later, and the like. Moreover, in this description, with regard to a storage medium, HDD 215 is described as a representative storage medium; however, besides this, the storage medium may be one using a semiconductor storage element.

ADC for audio 216 performs conversion processing for a sound, which is to be fed from stereo microphone 217, from an analog electrical signal into a digital electrical signal.

Stereo microphone 217 converts a sound outside camcorder 100 into an electrical signal, and outputs the converted electrical signal.

Note that, though the hardware configuration of camcorder 100 is illustrated as described above, the present invention is not limited to the above-described configuration. For example, it is also possible to realize ADC for video 202, video signal conversion circuit 203 and the like as a single integrated circuit, and it is also possible to realize a part of the software program, which is to be executed by CPU 204, as hardware by using FPGA (Field Programmable Gate Array) separately.

[1-1-3. Functional Configuration of Imaging Device]

Figure 5:
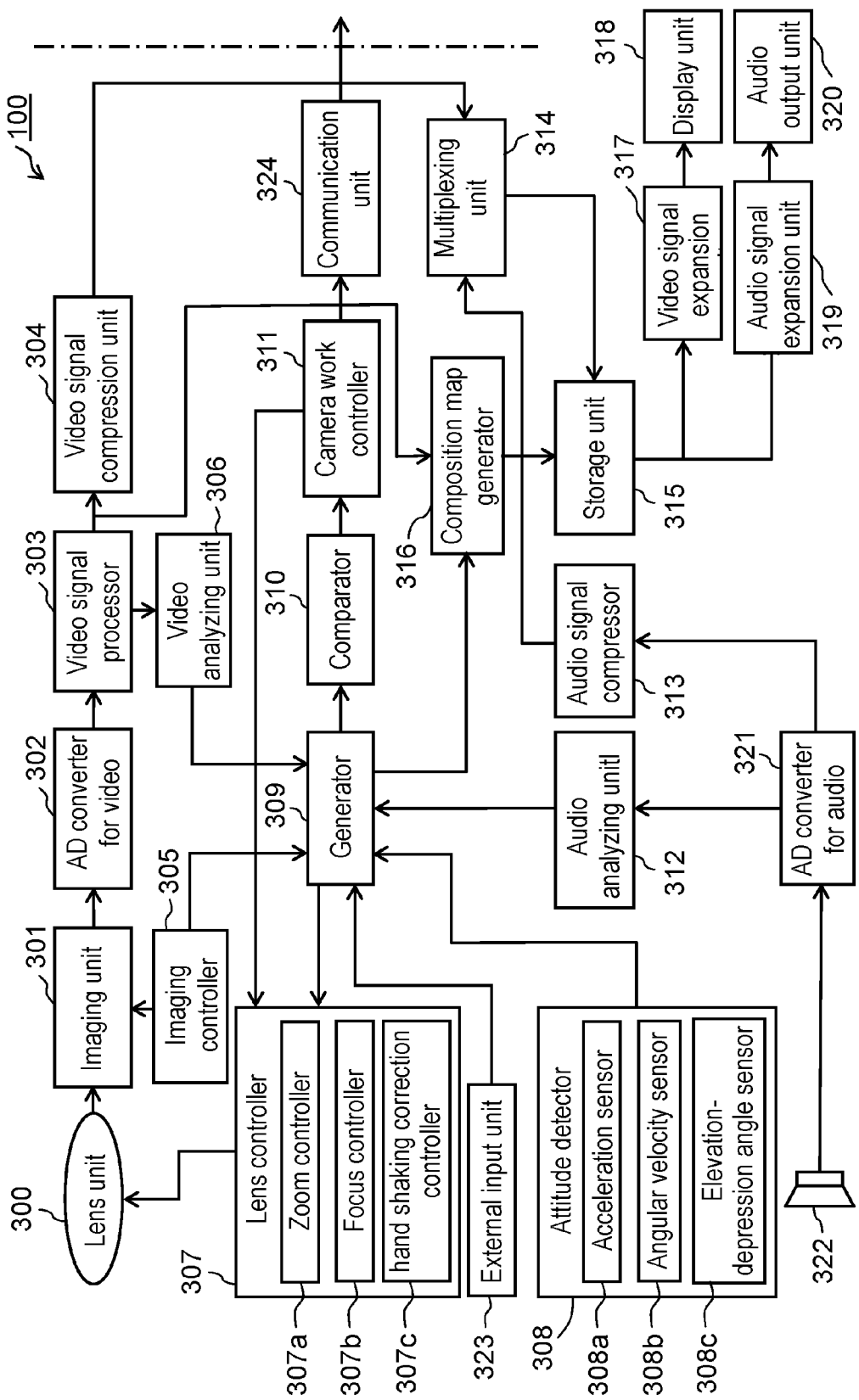
FIG. 5 is a functional configuration diagram showing a functional configuration of the camcorder according to the present disclosure in the first exemplary embodiment.

FIG. 5 is a detailed functional configuration diagram explaining a functional configuration of camcorder 100.

Camcorder 100 includes lens unit 300, imaging unit 301, AD converter for video 302, video signal processor 303, video signal compression unit 304, imaging controller 305, video analyzing unit 306, lens controller 307, attitude detector 308, generator 309, comparator 310, camera work controller 311, audio analyzing unit 312, audio signal compression unit 313, multiplexing unit 314, storage unit 315, composition map generator 316, video signal expansion unit 317, display unit 318, audio signal expansion unit 319, audio output unit 320, AD converter for audio 321, microphone unit 322, external input unit 323, and communication unit 324. In the first exemplary embodiment, camera work controller 311 is described as an example of a controller.

Lens unit 300 adjusts the focal length, zoom (magnification rate of video) and the like for the light incident from the subject. These adjustments are controlled by lens controller 307. Lens unit 300 corresponds to lens group 200 shown in FIG. 4.

Imaging unit 301 converts the light, which has transmitted through lens unit 300, into an electrical signal. By control of imaging controller 305, imaging unit 301 outputs data of an arbitrary range on the imaging device. Moreover, besides the video data, imaging unit 301 is also capable of outputting information such as: trichromatic space information; white color coordinates; gain information of at least two among three primary colors; color temperature information; Δuv (delta uv); and gamma information of the three primary colors or a luminance signal. These pieces of information are output to generator 309. Imaging unit 301 corresponds to imaging device 201 of FIG. 4.

AD converter for video 302 converts the electrical signal, which comes from imaging unit 301, from an analog electrical signal to a digital electrical signal in accordance with a predetermined processing content. AD converter for video 302 corresponds to ADC for video 202 of FIG. 4.

Video signal processor 303 converts the digital signal, which is output from AD converter for video 302, into a predetermined video signal format. For example, video signal processor 303 converts the digital signal into a video signal conforming to a number of horizontal lines, a number of scanning lines and a frame rate, which are defined by NTSC. Video signal processor 303 corresponds to video signal conversion circuit 203 of FIG. 4.

Video signal compression unit 304 performs predetermined coding-conversion for the digital signal, which is processed by video signal processor 303, compresses a data amount, and so on. Specifically, there are encoding methods such as MPEG2, MPEG4 and 11.264. Video signal compression unit 304 corresponds to a compression function of compression/expansion circuit 212 of FIG. 4.

Imaging controller 305 controls operations of imaging unit 301. Specifically, imaging controller 305 controls an exposure value, a capturing rate per second, a sensitivity, and the like of imaging unit 301 at the time of the capturing. Moreover, these pieces of control information are also output to generator 309 at the same time. Imaging controller 305 is realized by one of control algorithms to be processed by CPU 204 of FIG. 4.

Video analyzing unit 306 extracts a feature of the captured video image from the signal of the video image. Video analyzing unit 306 analyzes the video image signal, thereby extracting the feature of the video image. Here, for the analysis, video analyzing unit 306 detects luminance information and color information, which are included in the video image, a motion estimation, a white balance, and further, a face of a person in a case where the face of the person is included in the video image, and so on. For the luminance information and the color information, for example, one screen of the video image is divided into totally 576 blocks (=laterally 32×longitudinally 18), and distributions of colors and luminance, which are included in the respective blocks, are calculated. Moreover, it is possible to realize the motion estimation by calculating differences on amounts of some features between a plurality of frames. Furthermore, it is possible to realize the face detection by pattern matching of the feature amounts, which is performed by learning feature amounts representing the face features, and the like. Video analyzing unit 306 is realized by one of algorithms to be subjected to software processing by CPU 204 of FIG. 4.

Lens controller 307 controls operations of lens unit 300. In response to a control signal coming from camera work controller 311 to be described later, lens controller 307 controls zooming, focusing and the like of lens unit 300. Lens controller 307 includes zoom controller 307a, focus controller 307b, hand shaking correction controller 307c, and the like.

Zoom controller 307a controls a zoom lens of lens unit 300, thereby magnifying the incident light, which comes from the subject, to a desired magnification rate, and allows the zoom lens to input the incident light to imaging unit 301. Focus controller 307b controls a focus lens of lens unit 300, thereby setting the focal length between the subject and imaging unit 301. Hand shaking correction controller 307c suppresses a hand shaking of the apparatus at the time of capturing the video image and the like. Lens controller 307 controls lens unit 300, and in addition, and outputs these pieces of the control information to generator 309. Lens controller 307 corresponds to lens control module 206 of FIG. 4.

Attitude detector 308 detects an acceleration, an angular velocity, an elevation-depression angle and the like of camcorder 100. Attitude detector 308 includes acceleration sensor 308a, angular velocity sensor 308b, and elevation-depression angle sensor 308c. These sensors are used for a purpose of detecting an attitude of camcorder 100 and a changing status thereof, and so on. It is desirable to detect the acceleration and the angular velocity in three directions which are a vertical direction and (two) horizontal directions. Attitude detector 308 corresponds to attitude detection sensor 207 of FIG. 4.

Microphone unit 322 converts an ambient sound into an electrical signal, and outputs the electrical signal as an audio signal. Microphone unit 322 corresponds to stereo microphone 217 of FIG. 4.

AD converter for audio 321 converts the analog electrical signal, which is input from microphone unit 322, into a digital electrical signal. AD converter for audio 321 corresponds to ADC for audio 216 of FIG. 4.

Audio analyzing unit 312 extracts a characteristic sound from voice data converted into the digital electrical signal. As the characteristic sound here, for example, there are a voice of the video taker, a pronunciation of a specific word, a cheer, a shot and the like. It is possible to extract these sounds by using a method of previously registering specific frequencies inherent in these sounds (voices) and determining these sounds based on results of comparison therewith, and the like. Moreover, besides the above, audio analyzing unit 312 also detects a feature such as an input level of the sound captured by microphone unit 322. Audio analyzing unit 312 is realized by one of the algorithms to be subjected to the software processing by CPU 204 of FIG. 4.

Audio signal compression unit 313 converts the voice data, which is output from AD converter for audio 321, by a predetermined encoding algorithm. As the encoding, there are methods such as MP3 (MPEG Audio Layer-3) and AAC (Advanced Audio Coding). Audio signal compression unit 313 is realized by one of compression functions of compression/expansion circuit 212 of FIG. 4.

External input unit 323 outputs various pieces of information received from an outside at the time of capturing the video image, for example, capturing index information and the like, which are received by button input by the video taker or through a communication from the outside. Note that the capturing index information is an identification number for use in identifying the respective pieces of the capturing, and the like, for example, the identification number including a number for identifying a video image scene or a number indicating a number of capturing times at a time of film shooting, and the like. External input unit 323 corresponds to input button 208 of FIG. 4, and the like.

Generator 309 generates information about capturing at a time of capturing a video image and still image on a predetermined unit of video content (for example, 1 frame), external input information and other information as attribute information, which is information about attribute. Generator 309 classifies the attribute information on a time unit at the time of the capturing.

The information about capturing mainly includes: control information regarding the exposure value, the capturing rate per second, the sensitivity and the like at the time of the capturing, the control information being output from imaging controller 305; information regarding states of the zooming, the focusing, the hand shaking correction and the like at the time of the capturing, the information being output from lens controller 307; and information regarding the attitude at the time of the capturing, the change thereof and the like, the information being output from attitude detector 308. The external input information is information of the button input by the video taker, information characterizing a video image scene, and the like.

Other information is mainly information regarding features of the video image, such as the luminance distribution, the color distribution, the motion estimation, the white balance and the face of the person, the information being output from video analyzing unit 306.

As examples of the information included in the attribute information, there are pieces of information as below.
Focal length
Zoom magnification rate
Exposure Value
Capturing rate per second (frame rate, shutter speed)
Sensitivity
Information about chromaticity space of position of three primary color
White balance
Information about gains of at least two among three primary colors
Information about color temperature information
Δuv (delta uv)
Gamma information of three primary colors or luminance signal
Color distribution
Motion Estimation
Person (face recognition, individual authentication by face, person recognition, individual gait recognition from one's way of walking and gesture)
Camera attitude (acceleration, angular velocity, elevation angle/depression angle, orientation, measured position value by GPS, and the like)
Capturing time (capturing start time, capturing end time)

Capturing index information (for example, setup value of capturing mode of camera)
  User's input
  Frame rate
  Sampling frequency
  Amount of change in composition of an image The attribute information also includes information, which is calculated from the above-described information and characterizes the video image scene (that is, information obtained by combining various information at the time of the capturing, analyzing these, and so on). For example, it becomes possible to obtain information of the camera work such as the pan and the tilt at the time of the capturing of camcorder 100 from the information of the camera attitude (acceleration, angular velocity, elevation-depression angles and the like). Moreover, the information of the focal length and the zoom magnification rate is directly usable as the attribute information. Generator 309 extracts or calculates information, which is useful for scene evaluation, from the various information at the time of the capturing, and generates attribute information such as position information of a face and a person, position information of a moving body and position information of a sound at a specific point of time.

Comparator 310 compares pieces of the attribute information, which are generated by generator 309 during different periods in the respective capture directions, with one another. Then, based on a result of the comparison, comparator 310 evaluates priority orders of the respective capture directions, and determines priority orders in the respective pieces of capturing.

Camera work controller 311 determines a capturing direction from the information of the priority orders of the capture directions of which orders are placed by comparator 310, and generates information regarding operations of lens unit 300 and movement information regarding a movement in a pan direction of camera pantilter 500 and a movement in a tilt direction thereof so that camcorder 100 can perform the capturing in the determined capture direction. Specific operations of camera work controller 311 will be described later.

Generator 309, comparator 310 and camera work controller 311 are one of the algorithms to be subjected to the software processing by CPU 204 of FIG. 4.

Communication unit 324 outputs the movement information, which is generated by camera work controller 311, as a control signal to camera pantilter 500. Communication unit 324 corresponds to output I/F 211 of FIG. 4.

Based on the captured video image, the attribute information generated by generator 309, and the like, composition map generator 316 generates a map indicating a position of a specific object (face, person, motion of moving body, sound and the like) in the capture range. A specific generation method and the like will be described later. The generated map is temporarily stored in storage unit 315, and is displayed on display unit 318. Composition map generator 316 is one of the algorithms of the software processing to be executed by CPU 204 of FIG. 4.

Multiplexing unit 314 multiplexes and outputs encoded video data, which is output from video signal compression unit 304, and encoded video data, which is output from audio signal compression unit 313. Multiplexing unit 314 may be software to be executed by CPU 204 of FIG. 4, or may be one to be subjected to hardware processing in compression/expansion circuit 212.

Storage unit 315 holds the encoded video data and the encoded audio data, which are output from multiplexing unit 314, temporarily or for a long period. Storage unit 315 corresponds to HDD 215, RAM 214, memory card 218 and the like of FIG. 4.

[1-1-4. Configuration of Camera Pantilter]

Figure 6:
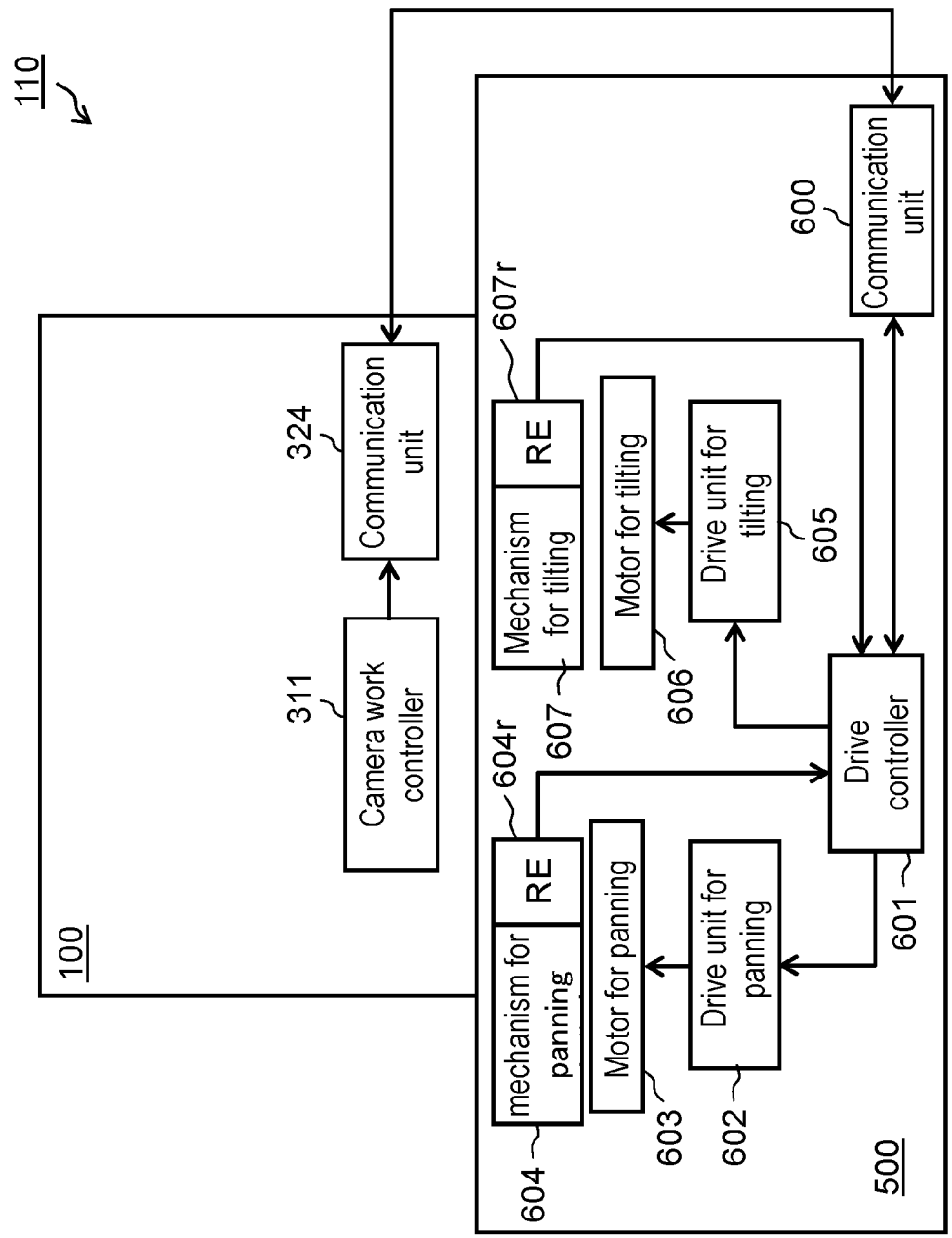
FIG. 6 is a functional configuration diagram showing a functional configuration of the camera pantilter in the first exemplary embodiment.

FIG. 6 is a functional configuration diagram showing a functional configuration of camera pantilter 500.

Camera pantilter 500 includes communication unit 600, drive controller 601, drive unit for panning 602, motor for panning 603, mechanism for panning 604, drive unit for tilting 605, motor for tilting 606, and mechanism for tilting 607.

Communication unit 600 is connected to communication unit 324 of camcorder 100, receives the control signal, and generates information about amount of movement.

Based on the information about amount of movement received by communication unit 600, drive controller 601 issues an instruction about the direction in which camera pantilter 500 should move, the amount of movement and a moving speed individually to drive unit for panning 602 and drive unit for tilting 605. Drive controller 601 is composed of a microcomputer in which a CPU, a ROM, a RAM and the like are combined with one another, and the like.

Based on an instruction signal coming from drive controller 601, drive unit for panning 602 controls operations of motor for panning 603. Specifically, motor for panning 603 is attached to mechanism for panning 604 rotatable in a transverse direction, and mechanism for panning 604 is configured to rotate in a crosswise direction in such a manner that motor for panning 603 rotates in positive/negative directions. Moreover, rotary encoder (RE) 604r is provided in mechanism for panning 604, and detects a movement of a rotation angle of mechanism for panning 604, whereby a detection value is output from RE 604r to drive controller 601.

In a similar way, based on the instruction signal coming from drive controller 601, drive unit for tilting 605 controls operations of motor for tilting 606. Motor for tilting 606 is attached to mechanism for tilting 607 rotatable in a longitudinal direction, and mechanism for tilting 607 is configured to rotate in a lengthwise direction in such a manner that motor for tilting 606 rotates in positive/negative directions. Moreover, RE 607r is provided in mechanism for tilting 607, and detects a movement of a rotation angle of mechanism for tilting 607, whereby a detection value is output from RE 607r to drive controller 601.

With the above-described configuration, a drive signal regarding a rotation direction (positive/negative directions), rotation amount and rotation speed of the motor is output from drive unit for panning 602 to motor for panning 603, whereby camcorder 100 attached to camera pantilter 500 can be rotated in the crosswise direction (horizontal direction). Moreover, a drive signal regarding a rotation direction (positive/negative directions), rotation amount and rotation speed of the motor is output from drive unit for tilting 605 to motor for tilting 606, whereby camcorder 100 attached to camera pantilter 500 can be rotated in the lengthwise direction (vertical direction).

[1-2. Operations]

[1-2-1. Default Operation]

Figure 7A:
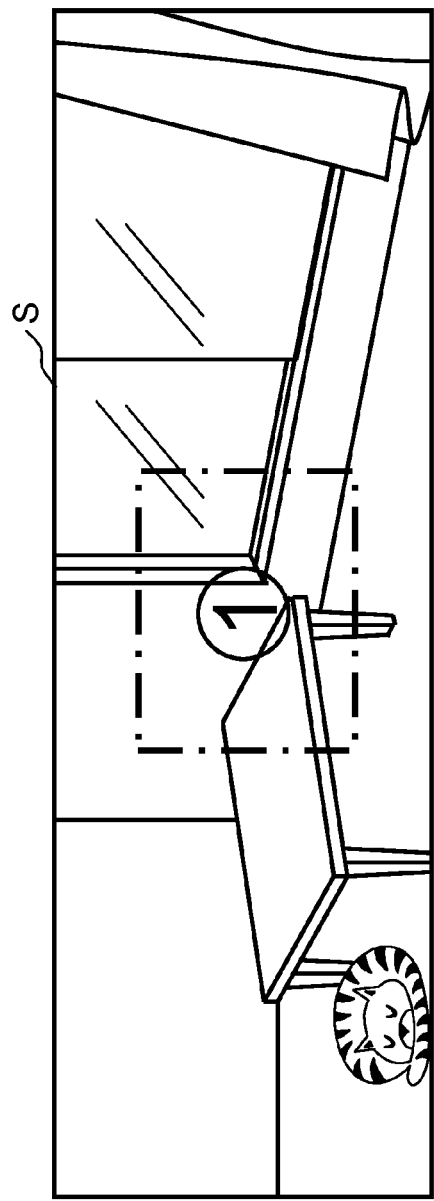
FIG. 7A is a diagram explaining a default operation of the video capturing system in the first exemplary embodiment.
Figure 7B:
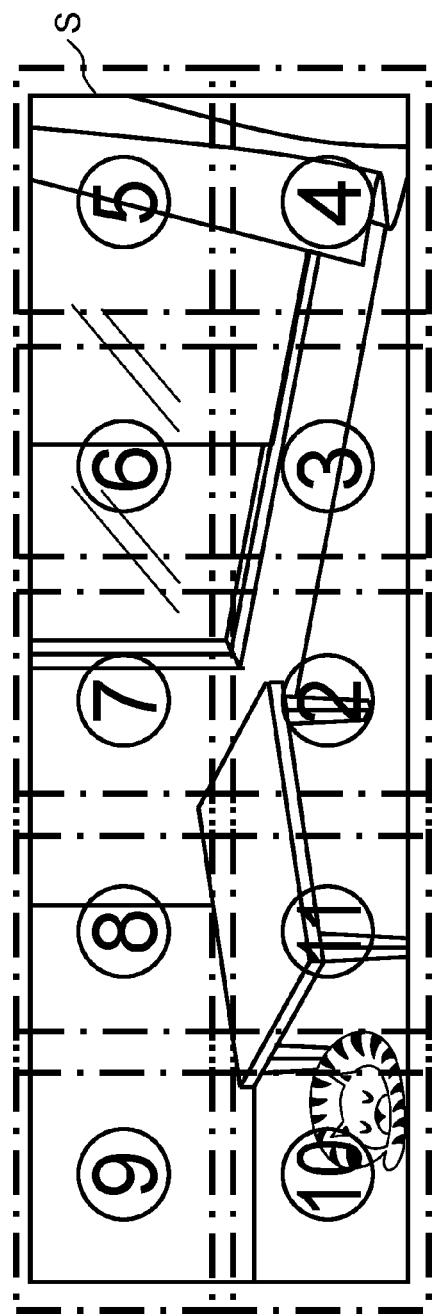
FIG. 7B is a diagram explaining a default operation of the video capturing system in the first exemplary embodiment.

FIG. 7A and FIG. 7B are diagrams for explaining default operations.

In FIG. 7A and FIG. 7B, capture range S represents a region set by a user, and a rectangle indicated by a dot-and-dash line at a center represents a capture region to be actually captured in capture range S. Moreover, numbers assigned to the respective capture regions denote orders of capturing the capture regions. Here, the capture regions represent capture directions for allowing camcorder 100 to capture the regions themselves. A case of FIG. 7A and FIG. 7B indicates that camcorder 100 can perform the capturing in 11 capture directions.

First, camera work controller 311 sets capture regions 1 to 11. As shown in FIG. 7A, capture region 1 is a region located at a center in the lengthwise and crosswise directions in capture range S. As shown in FIG. 7B, capture regions 2 to 11 are set so that capture range S (here, set at)±90° can be divided into regions in two stages in the lengthwise direction and five columns in the crosswise direction, and the respective regions can overlap one another little by little. In order that capture regions 1 to 11 can be captured in this order, camera work controller 311 calculates the movement information of camera pantilter 500 and a zoom position of lens unit 300. Note that the division of capture range S is not limited to a number of divisions of FIG. 7B, and may be set in response to a settable state of camera pantilter 500.

Camera pantilter 500 rotates by at most ±180° in the crosswise direction. A rotation angle in the crosswise direction is settable at three stages of ±45°, ±90° and ±180° in accordance with an instruction of the user, which is made by external input unit 323 of camcorder 100. Meanwhile, camera pantilter 500 rotates by ±30° in the lengthwise direction. In the first exemplary embodiment, the rotation angle in the crosswise direction is set at ±90°, and the rotation angle in the lengthwise direction is set at ±30°. In the first exemplary embodiment, camera pantilter 500 repeats operations of rotation by 1° to 20° and stop in response to the movement information.

Camera work controller 311 transmits the calculated zoom position of lens unit 300 to lens controller 307, and transmits the movement information of camera pantilter 500 to drive controller 601. Lens controller 307 and drive controller 601 control lens unit 300 and camera pantilter 500, respectively in response to the received lens position and movement information.

First, camera pantilter 500 moves to a position where camcorder 100 can capture capture region 1, and thereafter, stops. Camcorder 100 zooms lens unit 300 to such a zoom position where camcorder 100 can capture capture region 1, and captures capture region 1 for 0.3 second. Camcorder 100 determines whether a specific object is present in the video image obtained by capturing capture region 1. Next, camera pantilter 500 moves to a position where camcorder 100 can adjust the zoom position and capture capture region 2, and thereafter, stops. Camcorder 100 captures capture region 2 for 0.3 second. Camcorder 100 determines whether the specific object is present in the video image obtained by capturing capture region 2. Next, camera pantilter 500 moves to a position where camcorder 100 can capture capture region 3, and thereafter, stops. Camcorder 100 adjusts the zoom position, and captures capture region 3 for 0.3 second. Camcorder 100 determines whether the specific object is present in the video image obtained by capturing capture region 3.

As described above, for all of the capture regions, camera pantilter 500 sequentially repeats a series of such operations of; moving to the position where camcorder 100 can capture a next capture region and then stopping; allowing camcorder 100 to perform such capturing for 0.3 second after camcorder 100 performs the zoom control so that camcorder 100 can capture the capture region taken as the object; and determining whether the specific object is present in the video image obtained by capturing the capture region.

In a case of capturing all of the capture regions, and being incapable of detecting the specific object in the captured video image of capture range S, imaging system 110 repeats, from capture region 1, the above-described operations until detecting the specific object again.

Note that, though such a capturing time of camcorder 100 is not limited to 0.3 second, the description of the first exemplary embodiment is made on and after while taking as an example the case where the capturing time is 0.3 second.

Moreover, in the first exemplary embodiment, the description is made of the case where, when camera pantilter 500 is left still, the specific object (moving body) is detected while the capturing is being performed; however, an algorithm capable of detecting the moving body while moving camera pantilter 500 can also be introduced.

[1-2-2. Operation Mode]

A description is made of operations of imaging system 110 in a case of detecting the specific object in the captured video image. Camcorder 100 has a target tracking mode (first mode) of comparing only the information regarding the motion from the attribute information and determining the capture direction, and a party mode (second mode) of comparing the information regarding the specific object, such as the motion, the person (face) and the sound, from the attribute information, and determining the capture direction. Each of the modes is settable in accordance with an instruction of the user, which is made by external input unit 323 of camcorder 100.

[1-2-3. Target Tracking Mode]

Figure 8:
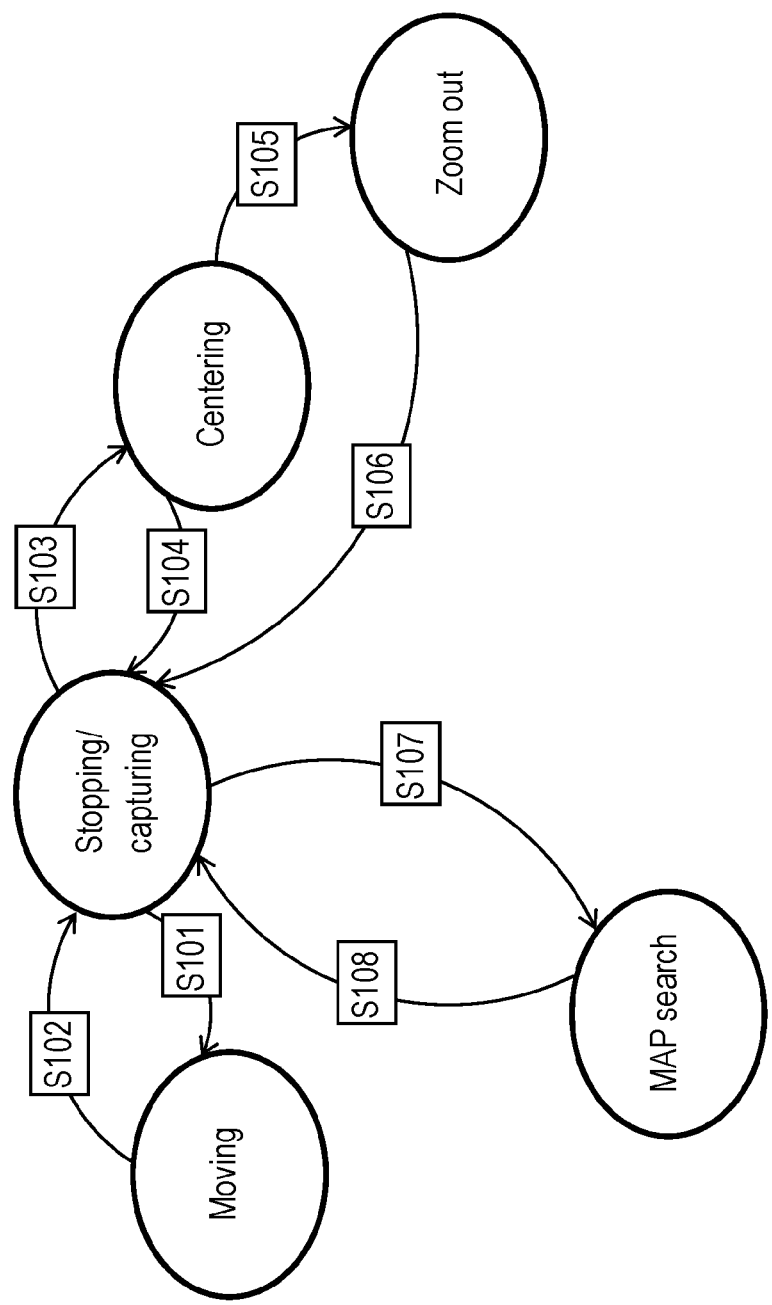
FIG. 8 is a state transition diagram explaining an example of operations of the video capturing system in the first exemplary embodiment.

FIG. 8 is a state transition diagram explaining an example of the operations of video imaging system 110. FIG. 8 is a state transition diagram explaining operations at a time of the target tracking mode.

In the case where the specific object cannot be detected in the video image captured by camcorder 100, then for the respective capture regions shown in FIG. 7A and FIG. 7B, the default operations (search), which are the movement and stop of camera pantilter 500 and the imaging and object determination of camcorder 100, are repeated (S101, S102). In a case where camcorder 100 detects a moving object (moving body) in the captured video image during 0.3 second as the capturing time, generator 309 of camcorder 100 adds the information regarding the motion (motion estimation) to the attribute information of the video image of the capture region, which is captured during this period.

Comparator 310 compares attribute information, which is generated in generator 309 and includes the information regarding the motion, and attribute information, which is generated in the capturing performed before this period, with each other. Based on a fact that the moving body is detected in the capturing performed this time though the moving body is not detected in the capturing in such a previous period, comparator 310 determines that the specific object comes to be present in this capture region. In this case, comparator 310 gives the present capture region a higher priority order than that of other capture region, from which the moving body is not detected.

For example, comparator 310 creates and updates information of the priority orders, which is shown in FIG. 9A and FIG. 9B, and passes the information to camera work controller 311.

FIG. 9A and FIG. 9B show an example of the information of the priority orders of the capture regions.

In FIG. 9A and FIG. 9B, a smaller number of the priority orders given to the respective capture regions indicates a higher priority order. FIG. 9A shows that the priority orders of the respective capture regions are equal to one another. In this case, imaging system 110 performs the default operations. In FIG. 9B, the priority orders are given to capture region 3, capture region 2 and other capture regions in this order.

Based on the information of the priority orders of the capture regions, which are given by comparator 310, and based on the direction of the motion estimation, camera work controller 311 controls camera pantilter 500 and/or lens controller 307 so that the moving body can be located at the center of the region that is being captured (that is, centering) (S103). Specifically, camera work controller 311 issues an instruction of the movement of camera pantilter 500 in a direction of tracking the moving body, and in addition, instructs lens controller 307 to zoom in so that the moving body can be captured to be large at the center of the capture region.

When camera pantilter 500 stops in the capture direction thus instructed, camcorder 100 performs the capturing for 0.3 second (S104). In a case where the moving body moves during the capturing, imaging system 110 repeats the operations of the centering and the capturing for the moving body (S103, S104). In a case where the moving body moves and is out of the capture region during the capturing, imaging system 110 zooms out (S105) and looks for the moving body (S106). In a case where the moving body cannot be detected, then based on the priority orders of the capture regions, which are given by comparator 310, imaging system 110 moves to a capture region having a next higher priority order (MAP search, S107). In a case where the moving body cannot be detected in the capture region, comparator 310 lowers the priority order of the capture region taken as an object.

Imaging system 110 repeats the above-described operations, returns to the default operations when all of the capture regions are given an equal priority order (S108), and repeats the default operations until detecting a new moving body (S101, S102).

[1-2-4. Party Mode]

Figure 10:
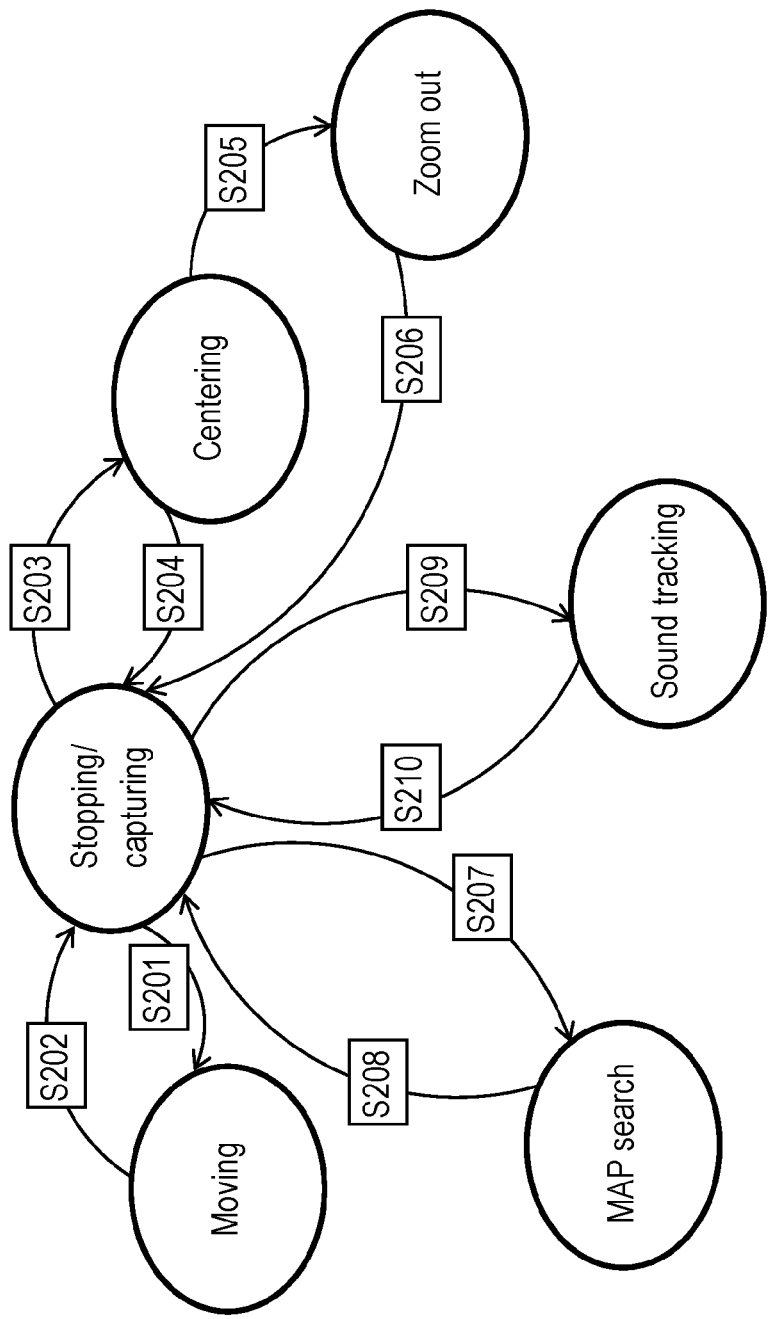
FIG. 10 is a state transition diagram explaining another example of the operations of the video capturing system in the first exemplary embodiment.

FIG. 10 is a state transition diagram explaining another example of the operations of video imaging system 110. FIG. 10 shows a state transition diagram when the party mode is set.

As mentioned above, in a case of being incapable of detecting the specific object, imaging system 110 repeats the default operations (S201, S202).

In the case where camcorder 100 detects the moving object (moving body) during 0.3 second as the capturing time, generator 309 adds the information regarding the motion (motion estimation) to attribute information of a video image of this period.

Comparator 310 compares the attribute information, which includes the information regarding the motion during the period, which is generated by generator 309, and the attribute information generated in an event where the capturing is performed during a period before this period, with each other, detects that the moving body is present in this capture region, and gives a high priority order thereto. Based on the information of the priority orders of the capture regions, which are given by comparator 310, and based on the direction of the motion estimation, camera work controller 311 instructs camera pantilter 500 and/or lens controller 307 to perform the centering (S203).

When camera pantilter 500 stops at the position thus instructed, camcorder 100 performs the capturing for 0.3 second (S204). In a case where the moving body moves during the capturing, imaging system 110 repeats the operations of the centering and the capturing for the moving body (S203, S204). In a case where the moving body moves and is out of the capture region during the capturing, then in a similar way to the target tracking mode, the operations make a transition in order of the zoom out (S205, S206), the MAP search (S207, S208) and the default operations (S201, S202).

Here, in a case where a voice is detected during the capturing, generator 309 adds information regarding the voice as attribute information of the video image during this period. Simultaneously, comparator 310 gives a highest priority order to the capture region having the attribute information including the information regarding the voice. Based on the priority order of the capture region, which is given by comparator 310, and based on the direction of the voice coming from microphone unit 322 (stereo microphone 217), camera work controller 311 issues an instruction of the movement of camera pantilter 500 in a direction of tracking a sound source (S209). When camera pantilter 500 stops at a position thus instructed, camcorder 100 performs the capturing for 0.3 second (S210).

[1-3. Conclusion]

In imaging system 110 of the first exemplary embodiment, comparator 310 compares the pieces of the attribute information, which are generated in the different periods, from one another for each capture direction, and determines the priority order in the capturing in each capture direction based on the result of the comparison. Camera work controller 311 determines the next capture direction based on the priority order, and controls the operations of imaging unit 301 and camera pantilter 500 based on the determined capture direction.

In such a way, camera pantilter 500 moves camcorder 100 to the position where the capturing can be performed in the determined capture direction, and camcorder 100 controls imaging unit 301 so that the specific object can be present in the capture region.

Hence, it becomes possible to intensively capture the specific object having a higher priority order.

Moreover, comparator 310 has the first mode of comparing the information regarding the motion and the second mode of comparing the information regarding the motion, the information regarding the face and the information regarding the voice.

In such a way, automatic capturing becomes possible, which responds to such a specific object as a pet of which motion should be focused on, and responds to such a specific object as a person of which motion, face and voice should be focused on, and to the feature of the object.

Second Exemplary Embodiment

In a second exemplary embodiment, a description is made of an imaging device, which generates a composition map from a captured video image signal, the composition map indicating a position of the specific object present in the capture range.

A description is made below of the second exemplary embodiment with reference to FIGS. 11 to 14.

[2-2. Specification of Fixed Moving Body]

In a case where the capturing is desired to be performed while focusing on the moving body as the specific object, then in the conventional camcorder, a curtain, an electric fan and a video image displayed on a television set are also recognized as moving bodies. Accordingly, camcorder 100 performs processing for specifying a moving body that repeats a specific motion or a moving body that does not perform large movement as a fixed moving body, and excluding the fixed moving body from the object to be focused as the specific object.

Specifically, comparator 310 extracts the information regarding the motion estimation based on the attribute information. In addition, based on the attribute information classified in the time unit, comparator 310 specifies a place where there are present the moving body that repeats the specific motion and the moving body that does not perform such large movement that exceeds the capture region. Comparator 310 determines that the moving body present in the specified place is the fixed moving body, and lowers a priority order thereof to a level equivalent to that of the capture region where there is no specific object.

In such a way, for example, a state where a stirring curtain is being captured on the captured video image endlessly can be avoided.

[2-2. Generation of Composition Map]

Composition map generator 316 refers to the attribute information of the video image within a predetermined time (for example, 1 minute) from the present based on the attribute information of the video image of each capture region, which is captured by imaging unit 301, and the time when the video image is captured, detects the presence of the specific object present in the capture range, and creates a composition map.

Figure 11:
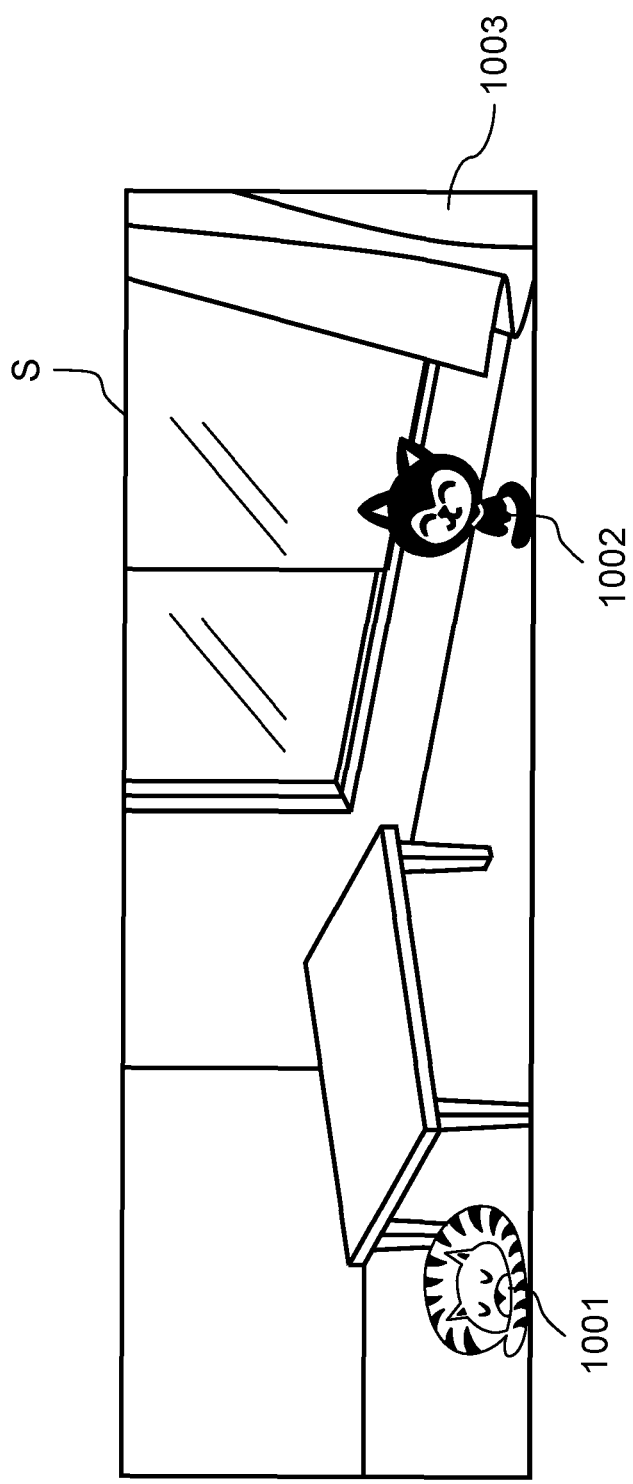
FIG. 11 is a diagram showing an example of a video signal displayed on a display unit in a second exemplary embodiment.

FIG. 11 is a diagram showing an example of a video signal displayed on display unit 318 (display 209). As shown in FIG. 11, in capture range S, there are present specific objects such as sleeping cat 1001 (animal), sitting-up cat 1002 (moving body, animal) and curtain 1003 (moving body).

Figure 12A:
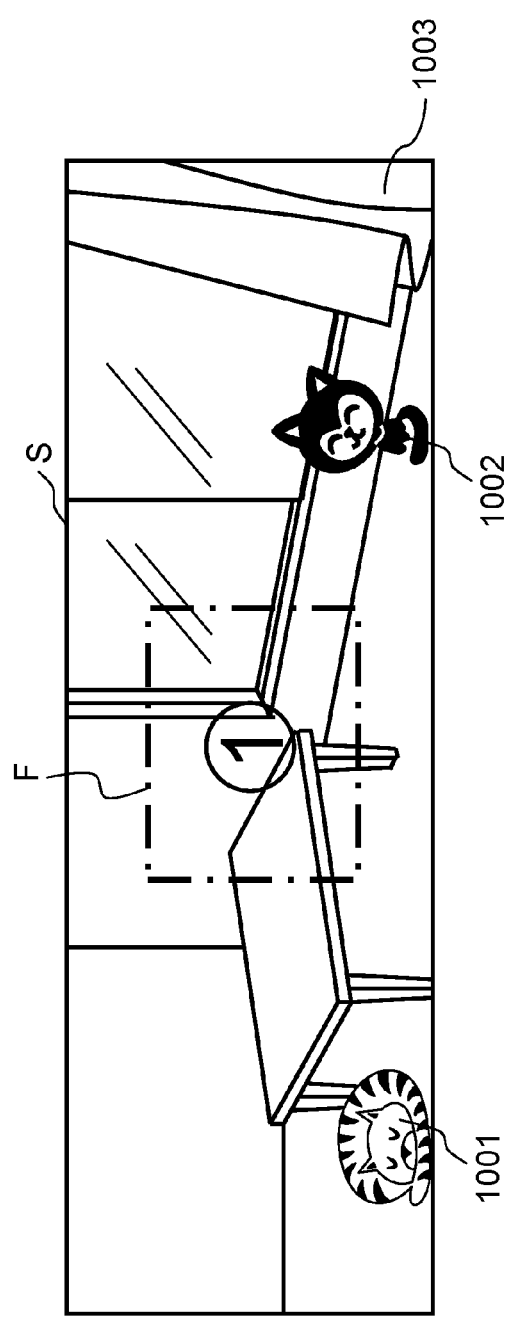
FIG. 12A is a diagram for explaining a capturing operation in the second exemplary embodiment.
Figure 12B:
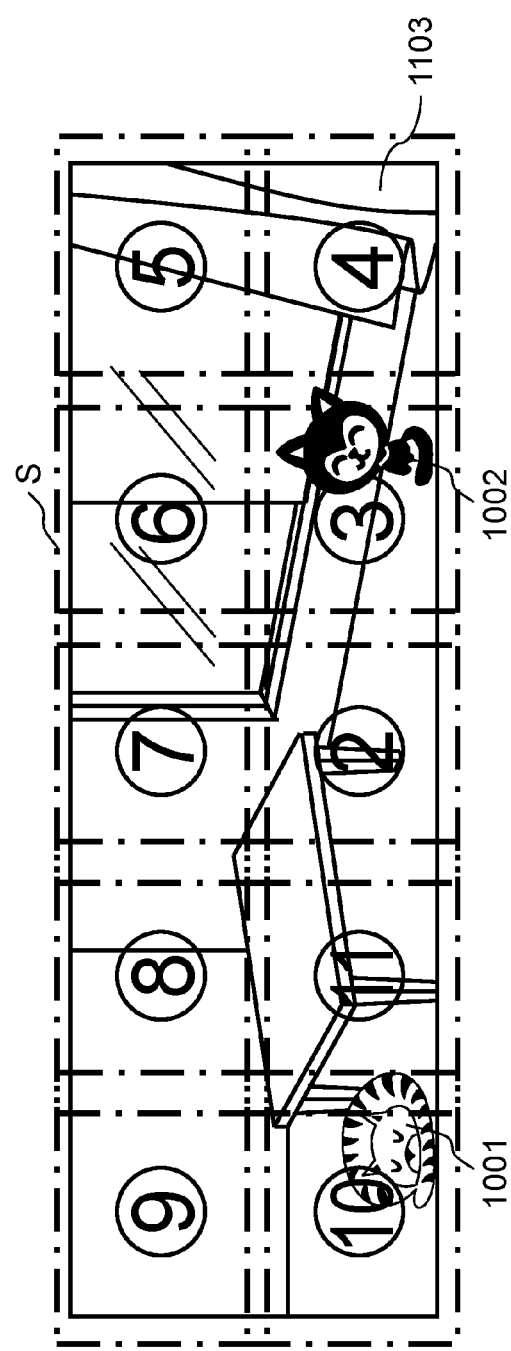
FIG. 12B is a diagram for explaining a capturing operation in the second exemplary embodiment.

FIG. 12A and FIG. 12B are schematic diagrams for explaining operations in the second exemplary embodiment. In FIG. 12A and FIG. 12B, capture range S represents a region set by the user, and capture regions indicated by dot-and-dash-line rectangles represent regions to be actually captured in capture range S. Moreover, numbers assigned to the capture regions denote orders of the capturing.

In a similar way to the first exemplary embodiment, in the second exemplary embodiment, as shown in FIG. 12B, capture range S is divided into regions in two stages in the lengthwise direction and five columns in the crosswise direction, the respective capture regions are allowed to overlap one another little by little, and the capturing is performed therefor. Moreover, with regard to the capturing, as shown in FIG. 12A and FIG. 12B, capture region 1 at a center position is captured, and other regions are captured from capture region 2 in order of the numbers. For creating the composition map, video images captured in capture regions 2 to 10 are used.

As shown in FIG. 12A and FIG. 12B, in a case where the specific objects such as sleeping cat 1001, sitting-up cat 1002 and curtain 1103 are present in capture range S, generator 309 generates information regarding the person (animal), the motion estimation and the like for the video images captured in capture regions 3, 4, 5 and 10, and adds the generated information to the attribute information.

FIG. 13A and FIG. 13B are diagrams explaining an example of the composition map in the second exemplary embodiment. For the explanation, FIG. 13A and FIG. 13B show ten capture regions in FIG. 12B and numbers assigned to the respective capture regions.

A description is made below of the generation of the composition map with reference to FIG. 13A.

Composition map 400 corresponds to capture range S. Upon detecting that an animal is present in lower right of capture region 10 from attribute information of the video image of capture region 10, composition map generator 316 disposes a rectangle, which indicates that the specific object is present, at a lower right position of a region of composition map 400, which corresponds to capture region 10. Moreover, composition map generator 316 detects that a moving animal is present in lower right of capture region 3 from attribute information of the video image of capture region 3, and disposes a dot-and-dash-line rectangle, which indicates that the specific object (moving body) is present, in lower right of a region of composition map 400, which corresponds to capture region 3. Moreover, from attribute information of the video images of capture region 4 and capture region 5, composition map generator 316 detects moving objects on right ends of capture region 4 and capture region 5, and disposes chain-line rectangles which represent that the specific object (moving body) is present at positions in composition map 400, which correspond to capture regions 4 and 5.

Moreover, from the attribute information classified in the time unit, composition map generator 316 determines that the moving object present on the right ends of capture region 4 and capture region 5 is the fixed moving body such as a curtain, an electric fan and a television set, which is fixed to a specific region. Composition map generator 316 deletes the moving body disposed in capture region 4 and capture region 5, defines the deleted moving body is the fixed moving body, and for example, disposes dotted-line rectangles as shown in FIG. 13B.

The created composition map is temporarily stored in storage unit 315, is superimposed on the video image that is being captured, and is displayed on display unit 318.

[2-2. Display of Composition Map]

FIG. 14 is a schematic diagram showing an example of the composition map to be displayed on display unit 318 (display 209) in the second exemplary embodiment.

Composition map 400 is displayed on an upper portion of display unit 318 so as not to hide the video image, which is being captured, as much as possible. A crosswise direction of composition map 400 corresponds to the crosswise direction of capture range S. Hence, a crosswise size of composition map 400 is always a size having a predetermined margin width with respect to the crosswise direction of display unit 318; however, the angle of capture range S corresponding thereto is set at any of ±45°, ±90° and ±180° by the user. Meanwhile, a lengthwise direction of composition map 400 corresponds to a lengthwise angle of 30° of capture range S, and is displayed, for example, with a size of 10% to 20% on an upper side of the display region of display unit 318.

In composition map 400, dot-line rectangle 401 represents that the specific object is present, and moreover, dot-and-dash-line rectangle 402 represents that the moving body is present, and rectangle 403 and rectangle 404 represent that the fixed moving body is present.

Note that, with regard to the rectangles of composition map 400, a line type thereof is not differentiated, but for example, a shape or color thereof is differentiated, whereby differences among the specific objects may be configured to be displayed.

[2-3. Update of Composition Map]

When information in the past is accumulated in composition map displayed on display unit 318, it becomes difficult to see composition map, and moreover, information of which function is deteriorated is displayed. Accordingly, based on the composition map, imaging system 110 gradually lowers, with time, reliability of such information already displayed for a predetermined time (for example, 1 to 3 minutes), the information being regarding the moving body, the person (animal), the voice and the like. For example, every 15 seconds, imaging system 110 lowers the reliability of the information 10% by 10%.

Specifically, based on the attribute information classified in the time unit, composition map generator 316 extracts the attribute information already displayed for the predetermined time, specifies information (rectangle) to be deleted from the composition map, and deletes the information. In a similar way, based on the attribute information classified in the time unit, comparator 310 specifies a capture region in which the attribute information including the fact that the moving body is present is not updated for the predetermined time, and gives a high priority order to this capture region.

In such a way, on the composition map, only relatively new information, from which the past information deteriorated in function is deleted, is displayed. Moreover, priority orders as to from which region the search should be started when the specific object is out of the capture region and such a search operation is started also become clear.

[2-4. Capturing Operation]

Based on the comparison result of the comparator and the composition map created by the composition map generator, camera work controller 311 determines the priority orders of the respective capture directions.

The composition map of FIG. 13B includes the attribute information, which indicates the specific object (moving body), in capture region 3, the attribute information, which indicates the specific object, in capture region 10, and the attribute information, which indicates the fixed moving body, in capture regions 4 and 5. First, from the composition map, camera work controller 311 gives a highest priority order to capture region 3 where sitting-up cat 1002 (moving body) is present. Next, camera work controller 311 gives a priority order, which is next to capture region 3, to capture region 10 where sleep cat 1001 is present. Camera work controller 311 gives a priority order, which is determined by comparator 310, to the regions other than capture region 3 and capture region 10.

In order that the capturing can be performed in the capture directions in order of the determined priority orders, camera work controller 311 generates the information regarding the operations of lens controller 307 and the movement information regarding the movement of camera pantilter 500 in the pan direction and the movement thereof in the tilt direction, and outputs these pieces of the generated information individually to lens controller 307 and camera pantilter 500.

[2-5. Conclusion]

Composition map generator 316 in the second exemplary embodiment detects the specific objects, which are present in capture range S, from the attribute information of the video image obtained in such a manner that imaging unit 301 captures capture range S for the predetermined time within the predetermined period, and generates the composition map indicating the positions of the specific objects. Moreover, comparator 310 compares the pieces of the attribute information in the different periods with one another, extracts the predetermined object that repeats the specific motion and the predetermined object that does not perform such large movement that exceeds the capture direction, and equalizes the priority order of the capture direction in which the extracted predetermined object is present to the priority order of the capture direction in which the predetermined object is not present.

In such a way, the moving body that repeats the specific motion or the moving body that does not perform the large movement can be specified as the fixed moving body, and can be excluded from the object to be focused as the specific object.

Hence, the priority orders as to from which region the search should be started when the specific object is out of the capture region and such a search operation is started become clear.

Moreover, display unit 318 displays the composition map, which is created by composition map generator 316, so that the composition map can be superimposed on the video image that is being captured by imaging unit 301.

In such a way, it becomes possible to recognize which portion in capture range S the video image that is being captured by imaging unit 301 corresponds to, and to explicitly recognize the presence of the specific objects serving as capturing targets in capture range S, and positions thereof.

Hence, it becomes possible to intensively capture the specific object having a higher priority order.

Moreover, the video image information is composed of the captured video image and the attribute information. Furthermore, the video image information has a layer structure for each specific time and a layer structure in a unit of the attribute information.

Other Exemplary Embodiments

As the exemplification of the technology disclosed in this application, the first exemplary embodiment and the second exemplary embodiment are described above. However, the technology in the present disclosure is not limited to these exemplary embodiments, and is also applicable to exemplary embodiments in which modification, replacement, addition, omission and the like are performed appropriately. Moreover, it is also possible to configure a new exemplary embodiment by combining the respective constituents described in the first exemplary embodiment described above.

Accordingly, another exemplary embodiment is exemplified below.

Note that, in the present disclosure, the description has been mainly made of the case where the video image is a moving picture; however, the present disclosure is not limited to this, and the imaging device may be a camera that mounts a microphone and the like thereon and captures a still image.

Moreover, in the movement of the camera pantilter, the description has been made while taking no account of hysteresis; however, there is a play portion in an actual drive portion, and accordingly, it is recommended to control the movement in consideration of this play portion.

Moreover, the description has been made while exemplifying the camcorder as the imaging device; however, the imaging device just needs to be an electronic instrument such as a smart phone, a surveillance camera and a digital still camera, which has a function of capturing and displaying the video image and the still image. In the present disclosure, the imaging device is connected to the drive device; however, the present disclosure can also be applied singly to the imaging device.

Moreover, in the present disclosure, the capture direction is determined based on the comparison result of the attribute information and the priority orders of the attributes included in the composition map; however, the present disclosure is not limited to the determination of the next capture direction. For example, a cutout range in an event of cutting out a part of a certain image from the image may be determined based on the priority orders of the attribute information included in the composition map. Moreover, a focused region and a tracked region of a part of a certain image may be determined.

Furthermore, the moving body such as a human face, a person, an animal and a vehicle, which is taken as a capturing target, or a rectangular region including these may be determined.

Moreover, architecture and a general object are taken as predetermined targets, and attribute information of these is added, whereby the present disclosure can be applied to a surveillance camera that monitors fixed place and object, and the like.

Note that the above-mentioned exemplary embodiment is one made for exemplifying the technology in the present disclosure, and accordingly, can be subjected to various types of modification, replacement, additions, omissions and the like within the scope of claims or equivalents thereof.

The present disclosure is useful for capturing in an assembly where many people gather, and the like, and for an imaging system such as a crime prevention (watching) camera and the like.

The invention claimed is:

1. An imaging system comprising:
   a drive device; and
   a video capturing apparatus that is connected to the drive device and controls an operation of the drive device,
   wherein the video capturing apparatus includes:
   an imaging unit that captures video images within a predetermined period over a predetermined capture range, the predetermined capture range including a plurality of capture directions, and each of the video images being captured at a different time within the predetermined period;
   a generator that generates, for each of the captured video images, attribute information regarding the captured video image, the attribute information being classified based on the time of capturing the video image within the predetermined period;
   a composition map generator that (i) extracts a predetermined object based on the attribute information generated for each of the plurality of captured video images, the predetermined object being present in the predetermined capture range, and (ii) generates a composition map indicating a position of the extracted predetermined object;
   a comparator that determines a priority order for each of the plurality of capture directions by comparing the attribute information generated for each of the plurality of captured video images;
   a controller that revises the priority orders determined for the plurality of capture directions based on the composition map, and controls operations of the imaging unit and the drive device based on the revised priority orders.

2. The imaging system according to claim 1, further comprising a display unit that displays one of the video images captured by the imaging unit,
   wherein the display unit displays the composition map in a superimposition manner on the one of the video images captured by the imaging unit.

3. The imaging system according to claim 1,
   wherein the comparator has:
   a first mode using information regarding a motion in the comparison of the attribute information; and
   a second mode using the information regarding the motion, information regarding a face and information regarding a voice in the comparison of the attribute information.

4. The imaging system according to claim 2,
   wherein the comparator has:
   a first mode using information regarding a motion in the comparison of the attribute information; and
   a second mode using the information regarding the motion, information regarding a face and information regarding a voice in the comparison of the attribute information.

5. The imaging system according to claim 1, wherein the comparator (i) compares the attribute information generated for each of the plurality of captured video images, (ii) extracts a predetermined object that repeats a specific motion and that does not perform such large movement that exceeds a capture direction, and (iii) equalizes a priority order of a capture direction in which the extracted predetermined object is present to a priority order of a capture direction in which the extracted predetermined object is not present.

6. An imaging device comprising:
   an imaging unit that captures video images within a predetermined period over a predetermined capture range, the predetermined capture range including a plurality of capture directions, and each of the video images being captured at a different time within the predetermined period;
   a generator that generates, for each of the captured video images, attribute information regarding the captured video image, the attribute information being classified based on the time of capturing the video image within the predetermined period;
   a composition map generator that (i) extracts a predetermined object based on the attribute information generated for each of the plurality of captured video images, the predetermined object being present in the predetermined capture range, and (ii) generates a composition map indicating a position of the extracted predetermined object;
   a comparator that determines a priority order for each of the plurality of capture directions by comparing the attribute information generated for each of the plurality of captured video images;
   a controller that revises the priority orders determined for the plurality of capture directions based on the composition map, and controls the imaging unit based on the revised priority orders.

7. An imaging device connected to a drive device, the imaging device comprising:
   an imaging unit that captures video images within a predetermined period over a predetermined capture range, the predetermined capture range including a plurality of capture directions, and each of the video images being captured at a different time within the predetermined period;
   a generator that generates, for each of the captured video images, attribute information regarding the captured video image, the attribute information being classified based on the time of capturing the video image within the predetermined period;
   a composition map generator that (i) extracts a predetermined object based on the attribute information generated for each of the plurality of captured video images, the predetermined object being present in the predetermined capture range, and (ii) generates a composition map indicating a position of the extracted predetermined object;

a comparator that determines a priority order for each of the plurality of capture directions by comparing the attribute information generated for each of the plurality of captured video images;

a controller that revises the priority orders determined for the plurality of capture directions based on the composition map, and controls operations of the imaging unit and the drive device based on the revised priority orders.

8. An imaging method of an imaging device including an imaging unit, the imaging method comprising:

capturing video images within a predetermined period over a predetermined capture range, the predetermined capture range including a plurality of capture directions, and each of the video images being captured at a different time within the predetermined period;

generating, for each of the captured video images, attribute information regarding the captured video image, the attribute information being classified based on the time of capturing the video image within the predetermined period;

extracting a predetermined object based on the attribute information generated for each of the plurality of captured video images, the predetermined object being present in the predetermined capture range;

generating a composition map indicating a position of the extracted predetermined object;

determining a priority order for each of the plurality of capture directions by comparing the attribute information generated for each of the plurality of captured video images;

revising the priority orders determined for the plurality of capture directions based on the composition map; and controlling the imaging unit based on the revised priority orders.

* * * * *